J. North,

Truss.

Nº 9,832. Patented July 5, 1853.

UNITED STATES PATENT OFFICE.

JOHN NORTH, OF MIDDLETOWN, CONNECTICUT.

TRUSS.

Specification of Letters Patent No. 9,832, dated July 5, 1853.

*To all whom it may concern:*

Be it known that I, JOHN NORTH, of Middletown, in the county of Middlesex and State of Connecticut, have invented new and useful Improvements in Trusses, and that the following is a full, clear, and exact description of the principle or character which distinguishes them from all other things before known and of the usual manner of making, modifying, and using the same.

The nature of my improvement in trusses and abdominal supporters consists in the employment of a right and left screw and nut in a peculiar manner to be described hereafter, by which the wearer can with great facility adjust the pressure of the pads without removing the truss. I am aware that a nut and screw have been employed to effect this adjustment but the use of the right and left screw after the mode to be set forth is original with myself and believed to be new. When this peculiar adjustment is combined with a swivel joint upon the main spring and a swivel joint upon the pad it secures every important adjustment and facility for adjusting inguinal pads.

Figure 1:
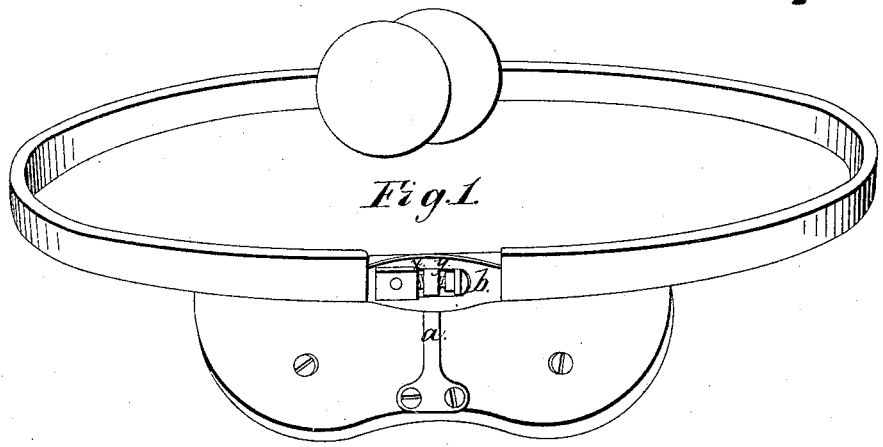
Figure 2:
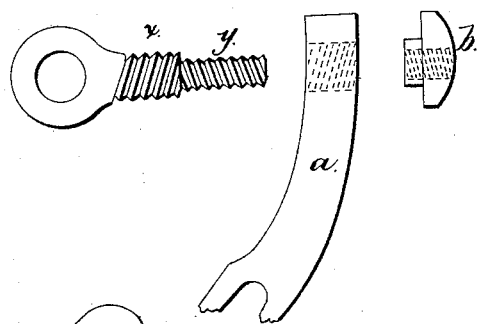
Figure 3:
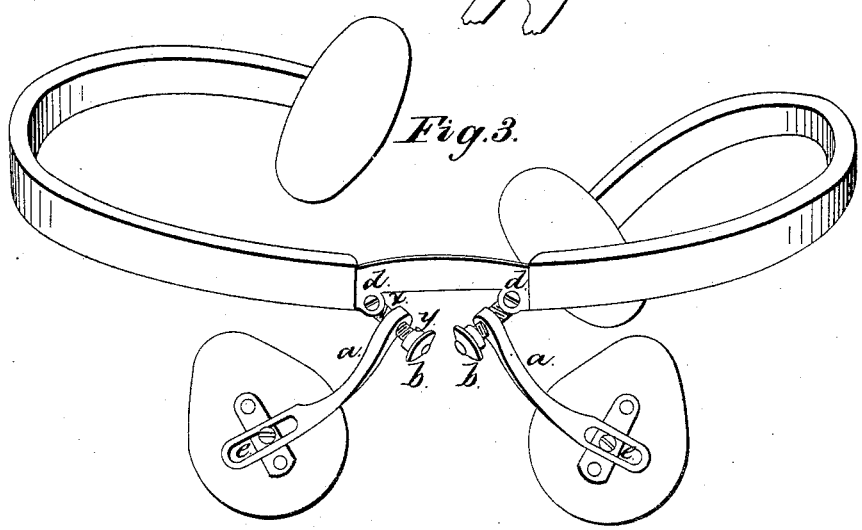

Figures 1 and 3 exhibit the adjustments applied to abdominal and inguinal trusses. Fig. 2 is a dissected view of the right and left screw and nut adjustments.

The arm of the truss pad ($a$) is screwed upon the right screw $x$, and the nut $b$ is screwed upon the left screw $y$ and in order to admit the arm $a$ to the right $x$, the screw $y$ is made smaller than the screw $x$. It will be readily seen that when the nut $b$ is close up to the arm $a$, it holds the arm from being moved in one direction and not in the other. The arrangement of the parts must be such that the arm and pad may move readily inward or toward the body and be restrained from motion outward. From this it follows that in order to adjust the pressure of the pad, the arm must be pressed slightly inward, the nut is then left free and may be moved up or off and all this can be done with one hand while the truss is on. The swivel joint $d$ is controlled by a common set screw, and the pad joint $e$ is such as has been commonly used for truss pads.

What I claim as my improvement in trusses and supporters, is—

The mode herein set forth of adjusting the pressure of the pad, that is to say by the employment of the right and left screw and the adjusting nut in combination with the pad lever in the manner and for the purpose set forth.

JOHN NORTH.

Witnesses:
WM. GREENOUGH,
TOLMIE CAMPBELL.